(12) United States Patent
Schutt et al.

(10) Patent No.: US 11,912,353 B2
(45) Date of Patent: *Feb. 27, 2024

(54) KINGPIN ASSEMBLY WITH ROTATION SENSOR ARRANGEMENT

(71) Applicant: SAF-Holland, Inc., Muskegon, MI (US)

(72) Inventors: Randy L. Schutt, Holland, MI (US); Ahmad Nizam Mohamad Jembari, Grand Haven, MI (US); Gerald Hungerink, Holland, MI (US)

(73) Assignee: SAF-Holland, Inc., Muskegon, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,972

(22) Filed: Feb. 27, 2023

(65) Prior Publication Data

US 2023/0219642 A1 Jul. 13, 2023

Related U.S. Application Data

(63) Continuation of application No. 16/250,643, filed on Jan. 17, 2019, now Pat. No. 11,702,155.

(Continued)

(51) Int. Cl.
*B62D 53/08* (2006.01)
*B62D 15/02* (2006.01)
*G01L 1/22* (2006.01)
*G01B 21/22* (2006.01)
*G01L 1/04* (2006.01)
(Continued)

(52) U.S. Cl.
CPC ....... *B62D 53/0842* (2013.01); *B62D 15/023* (2013.01); *B62D 53/0878* (2013.01); *G01B 21/22* (2013.01); *G01L 1/04* (2013.01); *G01L 1/12* (2013.01); *G01L 1/142* (2013.01);
(Continued)

(58) Field of Classification Search
None
See application file for complete search history.

(56) References Cited

U.S. PATENT DOCUMENTS 2,838,324 A 6/1958 Dalton
2,907,582 A 10/1959 Bourke
(Continued)

FOREIGN PATENT DOCUMENTS

DE 202020104506 U1 * 12/2021 ............... B62D 7/18
EP 1199547 A2 4/2002
(Continued)

OTHER PUBLICATIONS

European Patent Office; Supplementary Partial European Search Report; dated Jan. 2, 2021; entire document.

*Primary Examiner* — Octavia Davis Hollington
(74) *Attorney, Agent, or Firm* — Price Heneveld LLP

(57) ABSTRACT

A kingpin assembly includes a housing having a recess located therein, a kingpin having at least a portion located within the recess of the housing, wherein the kingpin is secured within the recess of the housing, and wherein the kingpin includes an axis extending along a length of the kingpin, and a sensor arrangement configured to sense a force exerted on the kingpin in a first direction that is substantially perpendicular to the longitudinal axis, and a second direction that is substantially perpendicular to the first direction.

20 Claims, 10 Drawing Sheets

Related U.S. Application Data

(60) Provisional application No. 62/619,462, filed on Jan. 19, 2018.

(51) Int. Cl.
   | | |
   |---|---|
   | *G01L 1/12* | (2006.01) |
   | *G01L 1/14* | (2006.01) |
   | *G01D 5/14* | (2006.01) |
   | *G01D 5/00* | (2006.01) |

(52) U.S. Cl.
   CPC .............. *G01L 1/22* (2013.01); *G01L 1/2218* (2013.01); *G01D 5/00* (2013.01); *G01D 5/145* (2013.01)

(56) References Cited

U.S. PATENT DOCUMENTS

| | | |
|---|---|---|
| 2,958,541 A | 11/1960 | Bar |
| 3,520,557 A | 7/1970 | Kamman et al. |
| 3,600,005 A | 8/1971 | Glaza |
| 3,807,765 A | 4/1974 | Pokornicki |
| 3,807,766 A | 4/1974 | Pleier et al. |
| 3,811,708 A | 5/1974 | Baaso |
| 3,887,251 A | 6/1975 | McKay |
| 4,254,967 A | 3/1981 | Scanlon |
| 5,411,281 A | 5/1995 | Poirier |
| 6,073,952 A | 6/2000 | Schulz |
| 6,220,617 B1 | 4/2001 | Hunger |
| 6,322,093 B1 | 11/2001 | Athans et al. |
| 6,502,839 B1 | 1/2003 | Chino et al. |
| 6,530,585 B1 | 3/2003 | Howard |
| 6,565,109 B1 | 5/2003 | Kloepfer |
| 6,587,041 B1 | 7/2003 | Brown, Jr. |
| 6,739,611 B2 | 5/2004 | Gisinger et al. |
| 6,773,023 B2 | 8/2004 | Athans et al. |
| 6,877,757 B2 | 4/2005 | Hayworth |
| 7,451,995 B2 | 11/2008 | Bloodworth et al. |
| 7,766,361 B2 | 8/2010 | Hungerink et al. |
| 7,784,365 B2 | 8/2010 | Masson |
| 8,917,170 B2 * | 12/2014 | Padula ................... B62D 53/08 280/433 |
| 8,960,704 B2 * | 2/2015 | Terpsma ................ B60D 1/015 280/433 |
| 9,016,708 B2 | 4/2015 | Terpsma |
| 9,550,475 B1 | 1/2017 | Walker |
| 10,124,841 B2 * | 11/2018 | Marquis ................. B60D 1/015 |
| 11,560,186 B2 * | 1/2023 | Heitzmann ........ B62D 53/0842 |
| 2001/0028160 A1 | 10/2001 | Athans et al. |
| 2002/0190497 A1 | 12/2002 | Metternich |
| 2004/0207170 A1 | 10/2004 | Kapaan et al. |
| 2006/0055138 A1 | 3/2006 | Pope et al. |
| 2009/0108556 A1 | 4/2009 | Hungerink et al. |
| 2015/0084311 A1 | 3/2015 | Van de Wetering |
| 2016/0238473 A1 | 8/2016 | Nakamura et al. |
| 2016/0339836 A1 | 11/2016 | Sibley, Jr. et al. |

FOREIGN PATENT DOCUMENTS

| | | | |
|---|---|---|---|
| EP | 2899101 A1 | 7/2015 | |
| EP | 3210857 A1 * | 8/2017 | ........... B62D 13/025 |
| GB | 810903 | 3/1959 | |
| GB | 1395003 | 5/1975 | |
| GB | 1593625 | 7/1981 | |
| GB | 2128952 | 5/1984 | |
| WO | 03000538 A1 | 1/2003 | |
| WO | WO-2015108565 A1 * | 7/2015 | ............. B60D 1/015 |

* cited by examiner

KINGPIN ASSEMBLY WITH ROTATION SENSOR ARRANGEMENT

CROSS-REFERENCE TO RELATED APPLICATIONS

This application is a continuation of U.S. patent application Ser. No. 16/250,643, filed on Jan. 17, 2019, entitled "KINGPIN ASSEMBLY WITH ROTATION SENSOR ARRANGEMENT," now U.S. Pat. No. 11,702,155, which claims the benefit of U.S. Provisional Patent Application No. 62/619,462, filed on Jan. 19, 2018, entitled "KINGPIN ASSEMBLY WITH ROTATION SENSOR ARRANGEMENT," the entire disclosures of which are incorporated herein by reference.

BACKGROUND

The present invention relates to a kingpin assembly for use within a fifth wheel hitch assembly, and particularly to a kingpin assembly that includes a freely rotating kingpin that allows rotation of the kingpin separate from the remaining components of the assembly during operational use thereof, and that includes a sensor arrangement for sensing forces exerted on the kingpin and/or a rotation sensor arrangement.

SUMMARY

One embodiment as shown and described herein includes a kingpin assembly that may include a housing having a recess located therein, a kingpin having at least a portion located within the recess of the housing, wherein the kingpin is secured within the recess of the housing, and wherein the kingpin includes an axis extending along a length of the kingpin, and a sensor arrangement configured to sense a force exerted on the kingpin in a first direction that is substantially perpendicular to the longitudinal axis and in a second direction that is substantially perpendicular to the first direction.

Another embodiment as shown and described herein may further or alternatively include a kingpin assembly that may include a housing having a recess located therein, a kingpin having at least a portion located within the recess of the housing, wherein the kingpin is rotationally secured within the recess of the housing, and wherein the kingpin includes an axis extending along a length of the kingpin, and a sensor arrangement configured to sense a first force exerted on the kingpin in a first direction that is substantially perpendicular to the longitudinal axis and a second force exerted on the kingpin in a second direction that extends in a substantially lateral direction, wherein the first direction extends in a substantially longitudinal direction Yet another embodiment as shown and described herein may further or alternatively include a kingpin assembly that may include a housing having a recess located therein, and a kingpin having at least a portion located within the recess of the housing, wherein the kingpin is rotatably secured within the recess of the housing for pivoting movement about a longitudinal axis of the kingpin, a sensor arrangement configured to sense a force exerted on the kingpin in a first direction that is substantially perpendicular to the axis of the kingpin, and a biasing member configured to rotatably bias the kingpin to a selected position with respect to the housing.

The embodiment of the kingpin assembly as shown and described herein allows free rotation of the kingpin by reducing operational wear of the same, allows easy access to and replacement of an associated kingpin subsequent to wear thereof, reduces the amount of maintenance typically required for fifth wheel hitch assemblies, and reduces wear due to debris entering the overall assembly. Further, the embodiments allow for sensing the longitudinal and lateral direction forces exerted on a kingpin and/or for sensing the rotation of the kingpin with respect to an associated fifth wheel hitch plate, thereby allowing dynamic control of vehicle braking and vehicle roll, early roll warning, sensing the relative angle between a towing vehicle, such as a semi-tractor, and a towed vehicle such as a heavy-duty commercial trailer, thereby providing information allowing for improved manual or autonomous vehicle control allowing dynamic engine and transmission control, and allowing dynamic aerodynamic measurements and minimization. Still further, the disclosed embodiments are more durable, allow replacement of certain components thereof by even unskilled personnel, are extremely efficient in use, capable of a long operating life, and particularly well adapted for the proposed use.

These and other features, advantages, and objects of the present invention will be further understood and appreciated by those skilled in the art by reference to the following specification, claims, and appended drawings.

BRIEF DESCRIPTION OF THE DRAWINGS

FIG. 9;

DETAILED DESCRIPTION OF THE PREFERRED EMBODIMENTS

Figure 1:
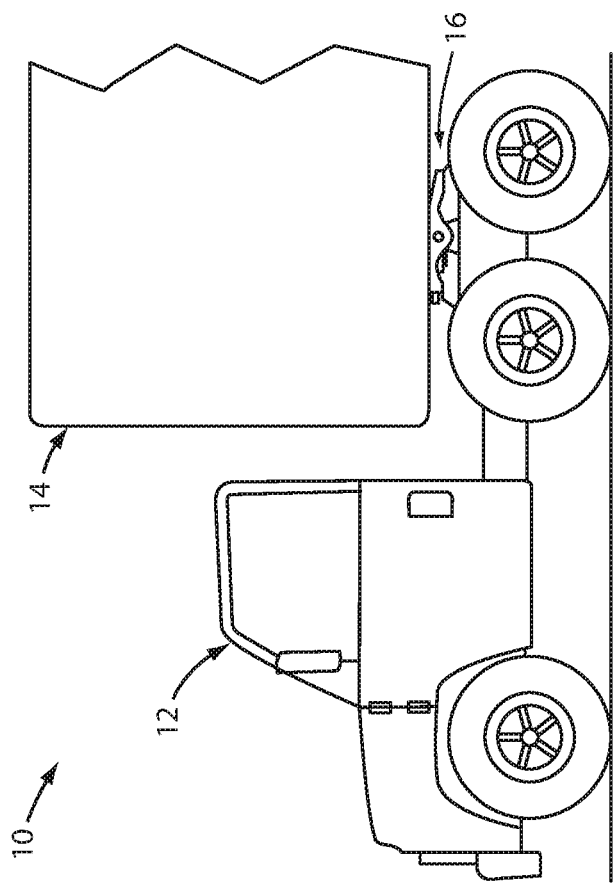
FIG. 1 is a side elevational view of a tractor and heavy-duty trailer supported thereby.
Figure 3:
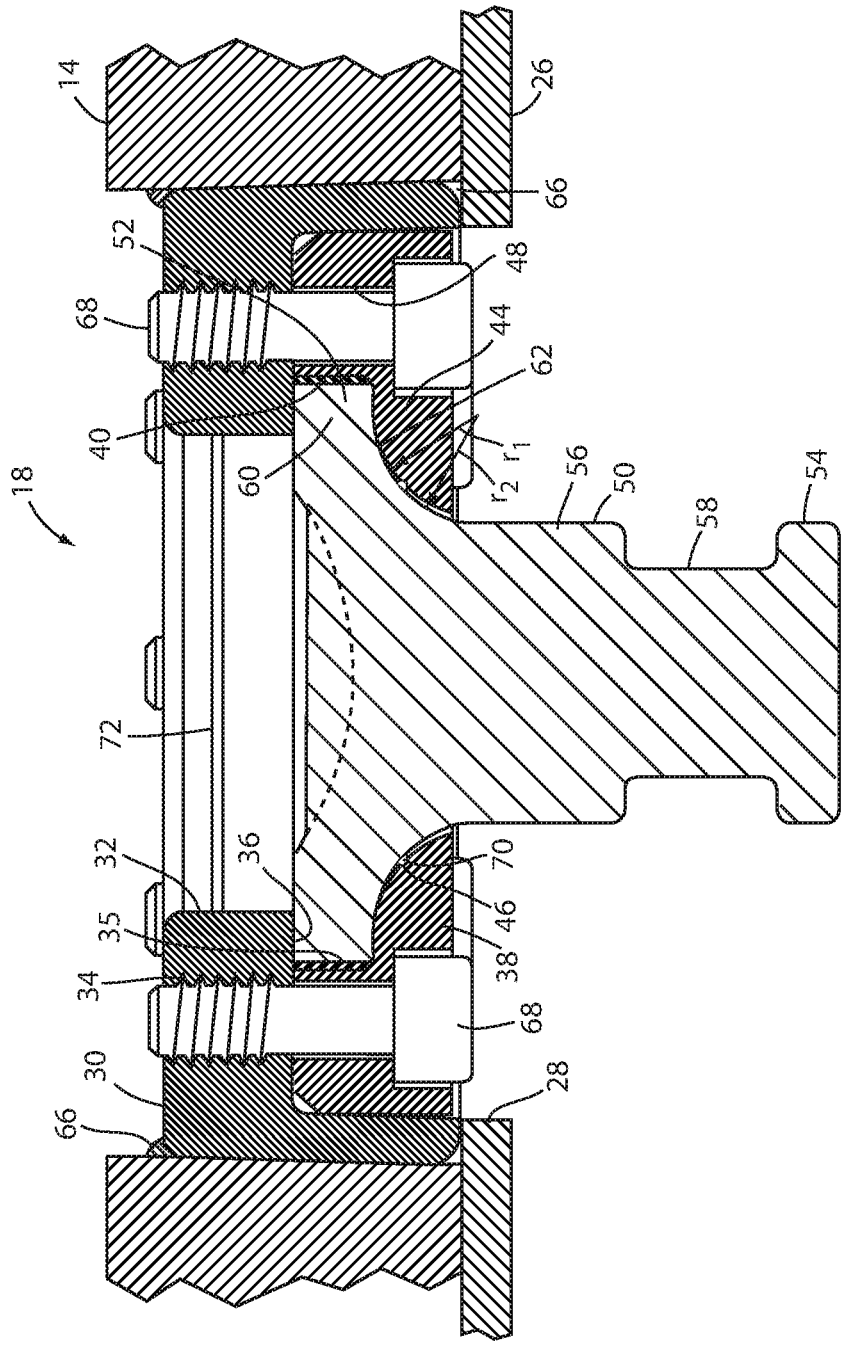
FIG. 3 is a cross-sectional side view of the kingpin assembly taken through the line III-III, FIG. 2.

For purposes of description herein, the terms "upper," "lower," "right," "left," "rear," "front," "vertical," "horizontal," and the embodiments thereof shall relate to the embodiment as oriented in FIGS. 1 and 3. However, it is to be understood that the various embodiments as shown and described herein may assume various alternative orientations, except where expressly specified to the contrary. It is also to be understood that the specific devices and processes illustrated in the attached drawings, and described in the following specification are simply exemplary embodiments of the concepts defined in the appended claims. Hence, specific dimensions and other characteristics relating to the embodiments disclosed herein are not to be considered as limiting, unless the claims expressly state otherwise.

Figure 2:
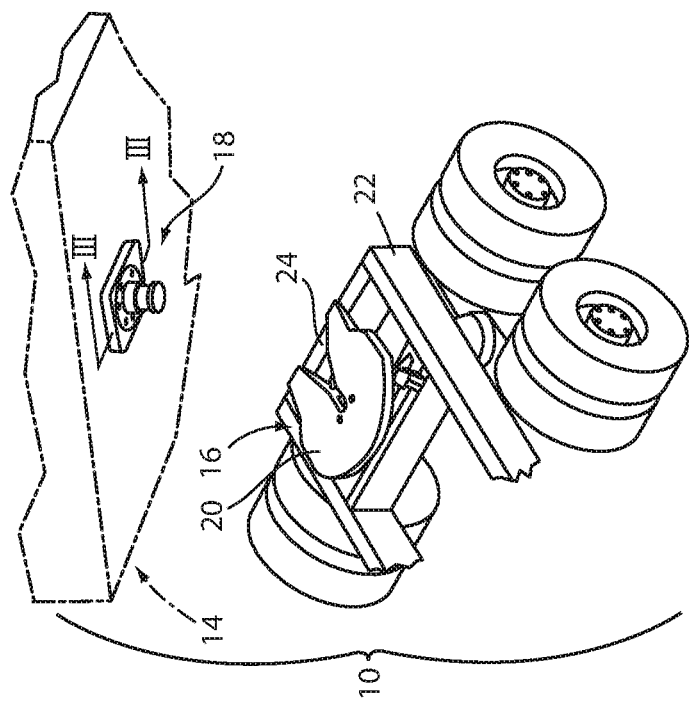
FIG. 2 is a perspective view of a fifth wheel hitch assembly and kingpin assembly of the present invention.

The reference numeral 10 (FIG. 1) generally designates a heavy duty tractor and trailer combination, wherein a semi-truck or tractor 12 operationally supports an associated trailer 14 via a fifth wheel hitch assembly 16 (FIG. 2) and a kingpin assembly 18 cooperating therewith. In the illustrated example, the fifth wheel hitch assembly 16 includes a fifth wheel hitch plate 20 pivotally coupled to a frame assembly 22 of the associated tractor 12 and including a tapered kingpin-receiving throat 24 and a locking assembly (not shown) as well known in the art.

The kingpin assembly 18 (FIG. 3) is adapted for use within a trailer skid plate 26 mounted to an underside of the associated trailer 14. The trailer skid plate 26 includes an aperture 28 extending therethrough and that receives the kingpin assembly 18 therein. The kingpin assembly 18 includes a housing 30 having a recess in the form of a centrally-located aperture 32 extending therethrough, and a plurality of threaded bolt-receiving apertures 34 spaced about the aperture 32. The recess or aperture 32 further includes a step wall 36. The kingpin assembly 18 further includes a ring-shaped collar member 38 including a centrally-located aperture that defines a cylindrically-shaped first portion 40 and an axially arcuately-shaped second portion 44 defining a radius $r_1$. The collar member 38 further includes a circumferentially-extending step or groove 46 located along a length of the second portion 44 of the aperture 40. The collar member 38 further includes a plurality of bolt-receiving apertures 48 spaced about the aperture 40 and that are co-aligned with the apertures 34 of the housing 30 when the collar member 38 is coupled with the housing 30, as described below.

The kingpin assembly 18 further comprises a kingpin 50 that includes an upper head portion 52, a lower head portion 54, a body portion 56, and a lock assembly-receiving portion 58. The upper head portion 52 of the kingpin 50 includes a cylindrical first portion 60 and an axially arcuately-shaped second portion 62 located between the first portion 60 and the body portion 56. The second portion 62 of the upper head portion 52 defines a radius $r_2$. The lock-assembly receiving portion or neck portion 58 is reduced in size relative to the overhead portion 54 and the body portion 56, and is adapted to receive the locking jaws (not shown) of an associated fifth wheel lock assembly thereabout.

In assembly, the housing 30 is placed above the aperture 28 of the trailer skid plate 26 and welded thereto about a circumference 66. The kingpin 50 is placed within the collar member 38 with the collar member 38 being secured to the associated housing 30 via a plurality of bolts 68. It is noted that a seal member in the form of an O-ring 70 is located within the groove 46, and that a wear disk 35 comprising a friction reducing material is located between the first position 60 of the kingpin 50, and the collar member 38. It is further noted that the radius $r_1$ of the second portion 44 of the collar member 38 and the radius $r_2$ of the second portion 62 of the upper head portion 52 of the kingpin 50 are each varying in distance about their respective arcs, and that the radii $r_1$, $r_2$ vary with respect to one another, such that the total area of the mating surfaces of the respective parts are reduced, thereby reducing the associated operational wear.

The kingpin assembly 18 further includes a dirt cover 72 welded within the aperture 32 of the housing 30, thereby preventing contamination of the pivoting couple between the kingpin 50 and the collar member 38. Alternatively, the dirt cover could be integrally formed with the housing 30.

In operation, the kingpin 50 is coupled to the associated fifth wheel hitch assembly 16 when locking jaws of the fifth wheel hitch assembly 16 are received about the lock assembly-receiving portion 58 of the kingpin 50 defined between the lower head portion 54 and the body portion 56 thereof. As the tow vehicle or tractor 12 turns out of alignment with respect to the towed trailer 14, the kingpin 50 is allowed to pivot with the components of the tractor 12 and the associated fifth wheel hitch assembly 16 without requiring movement of the housing 30, the collar member 38, nor any other component of the kingpin assembly 18.

Figure 4:
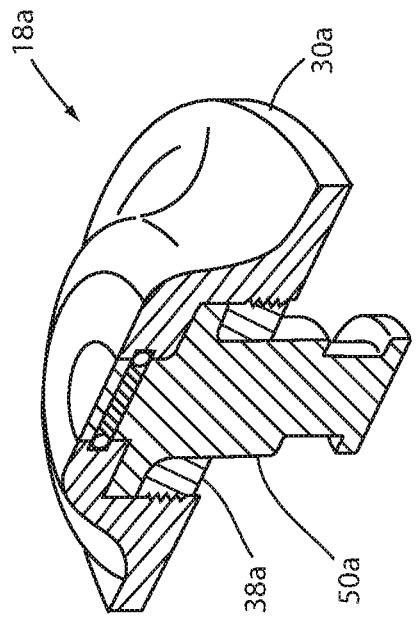
FIG. 4 is a cross-sectional perspective view of a first alternative embodiment of the kingpin assembly.
Figure 5:
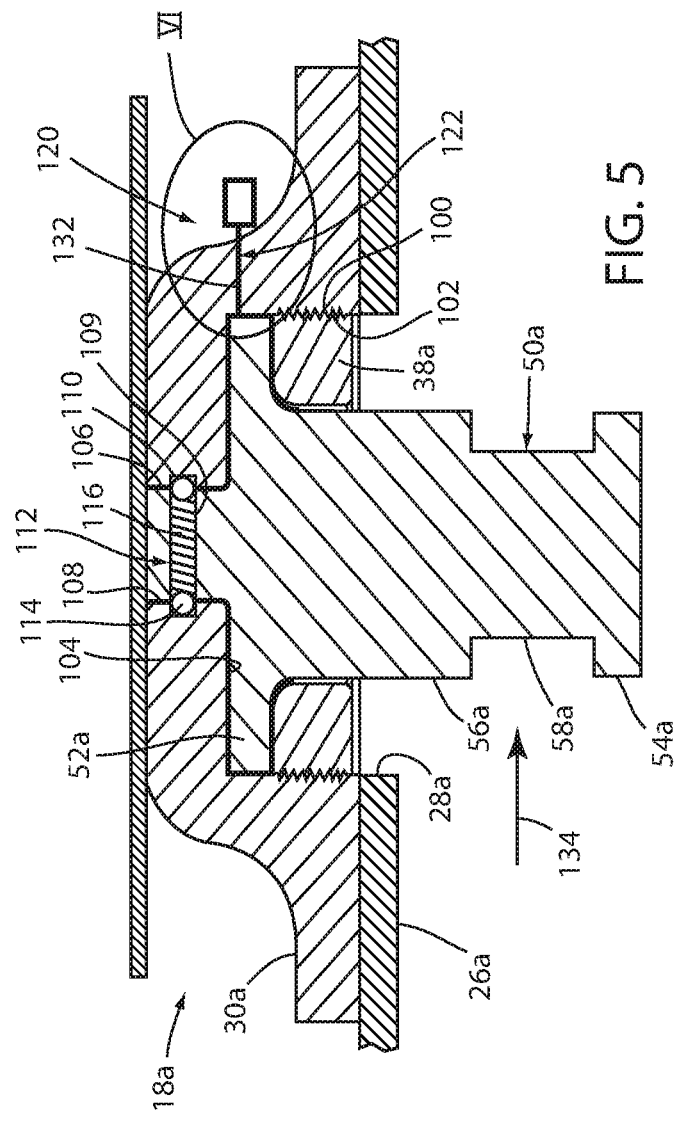
FIG. 5 is a cross-sectional side view of the first alternative embodiment of the kingpin assembly including a sensor arrangement.

The reference numeral 18a (FIGS. 4 and 5) generally designates another embodiment of the kingpin assembly. Since the kingpin assembly 18a is similar to the previously described kingpin assembly 18, similar parts appearing in FIG. 3 and FIGS. 4 and 5 respectively are represented by the same, corresponding reference numeral, except for the suffix "a" in the numerals of the latter. In the illustrated example, the kingpin assembly 18a includes the collar 38a having a threaded outer surface 100 that threadably engages a threaded portion 102 of the housing 30a and secures the collar 38a to the housing 30a in place of the bolts 68 of the previously described embodiment and within a recess or pocket or bore 104 of the housing 30a. An upwardly-extending alignment portion 106 of the kingpin 50a, and an alignment receiving portion 108 of the recess or bore 104 of the housing 30a that receives the alignment portion 106 therein. The alignment portion 106 includes an aperture 109 extending therethrough, while the portion 108 of the bore 104 includes a circumferentially-extending groove 110 aligned with the aperture 109. The assembly further includes a quick-connect assembly 112 comprising a pair of bearings 114 and a biasing spring member 116. In assembly, the quick-connect assembly allows temporary assembly of the kingpin 50a within the housing 30a, while allowing the operator to use both hands to complete the task of permanently securing the kingpin 50a within the housing 30a. Specifically, the bearings 114 and the spring member 116 are positioned within the channel 109, and the kingpin 50a is then placed within the bore 104 of the housing 30a until the bearings 114 are biased outwardly by the spring 116 and engage the groove 110 of the housing 30a. The collar member 38a is then positioned about the kingpin 50a and threadably received within the housing 30a thereby rotatably securing the kingpin 50a within the housing 30a.

Figure 6:
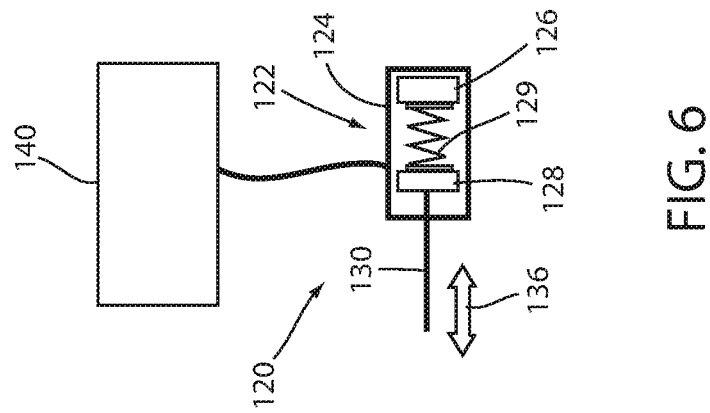
FIG. 6 is a schematic view of the sensor arrangement of FIG. 5.

The kingpin assembly 18a further includes a sensor arrangement 120 (FIGS. 5 and 6) configured to sense a load exerted on the kingpin 50a. In the illustrated example, the sensor arrangement 120 includes a deflection-type load cell 122 (FIG. 6) that includes a sensor housing 124 that houses an analog Hall sensor 126, a magnet 128 separated by a variable distance d, and a biasing spring 129 biasing the magnet 126 away from the Hall sensor 128. The sensor arrangement 120 further includes a plunger arm 130 operably coupled for movement with the magnet 128. The plunger arm 130 extends through a bore 132 that extends through the housing 30a and into the recess 104 such that the plunger arm 130 abuts the upper head portion 52a of the kingpin 50a. In operation, a force 134 exerted on the kingpin 50a moves the kingpin 50a relative to the housing 30a in turn moving the plunger arm 130 in the directions 136 depending upon the direction of the force 134. Movement of the plunger arm 130 changes the distance between the magnet 128 and the Hall sensor 126. Information gathered from the sensor 126 or plurality of sensors 126 if employed, may be communicated with a controller 140 and used to calculate loads exerted on the kingpin 50a. The calculations may be utilized to allow for dynamic control of vehicle braking, vehicle roll, engine and transmission control, and aerodynamic measurements and minimization.

Figure 7:
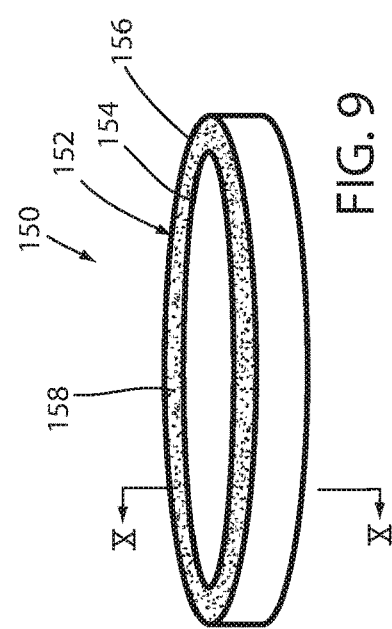
FIG. 7 is a cross-sectional perspective view of a second alternative embodiment of the kingpin assembly.
Figure 8:
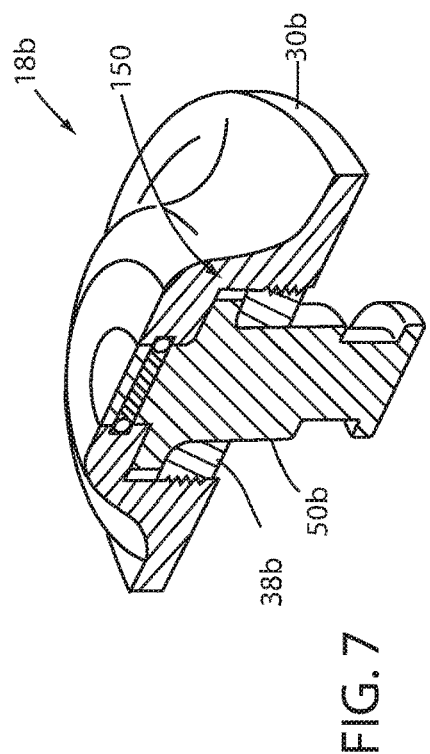
FIG. 8 is a cross-sectional side view of the second alternative embodiment of the kingpin assembly including a sensor arrangement.
Figure 9:
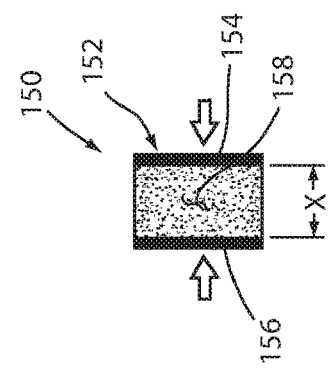
FIG. 9 is a perspective view of the sensor arrangement of FIG. 8, including a dielectric ring.
Figure 10:
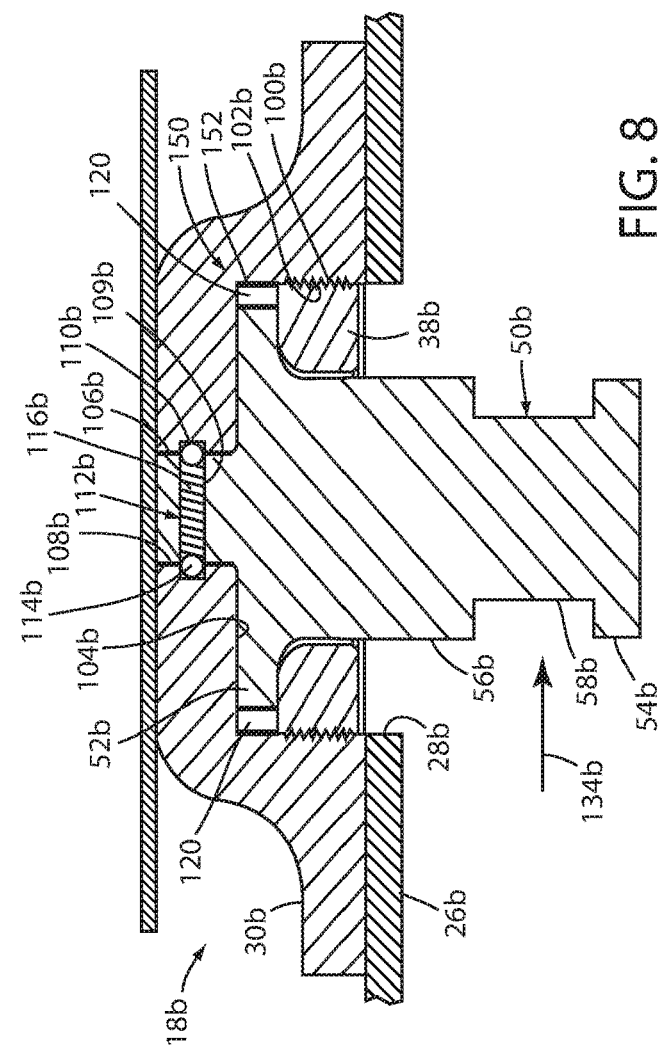
FIG. 10 is a cross-sectional view of the dielectric ring taken along the line X-X.

The reference numeral 18b (FIGS. 7 and 8) generally designates another embodiment of the kingpin assembly. Since the kingpin assembly 18b is similar to the previously described kingpin assembly 18a, similar parts appearing in FIGS. 4 and 5 and FIGS. 7 and 8 respectively are represented by the same, corresponding reference numeral, except for the suffix "b" in the numerals of the latter. The kingpin assembly 18b is similar in construction and assembly to the kingpin assembly 18a with the most notable exception being the replacement of the sensor arrangement 120a with the sensor arrangement 120b. In the illustrated example, the sensor arrangement 120b includes a capacitive-type load cell 150 that includes a capacitive ring 152 that is positioned between the upper head portion 52b of the kingpin 50b and the recess or bore 104b of the housing 30b. The capacitive ring 152 includes an inner metallic plate or ring member 154 and an outer metallic plate or ring member 156 that cooperate to house an elastomeric dielectric material 158 therebetween. In operation, a force 134b exerted on the kingpin 50b moves the kingpin 50b relative to the housing 30b, thereby compressing the ring 152 and reducing the distance X between the inner ring 154 and the outer ring 156, thereby changing the capacitance of the elastomeric dielectric material 158. Change in the electrical resistance within the dielectric material 158 may then be utilized to calculate the forces exerted on the kingpin 50b.

Figure 11:
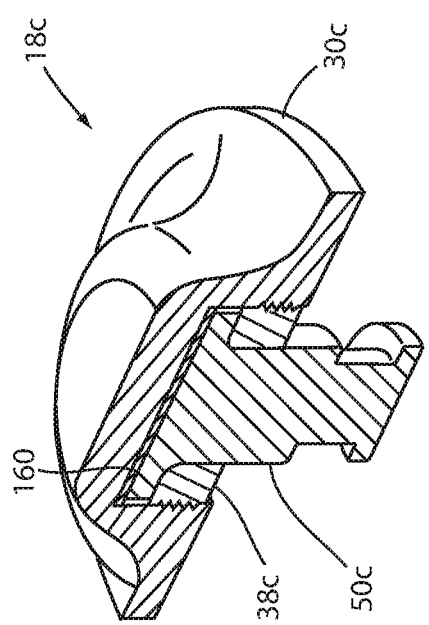
FIG. 11 is a cross-sectional perspective view of a third alternative embodiment of the kingpin assembly.
Figure 12:
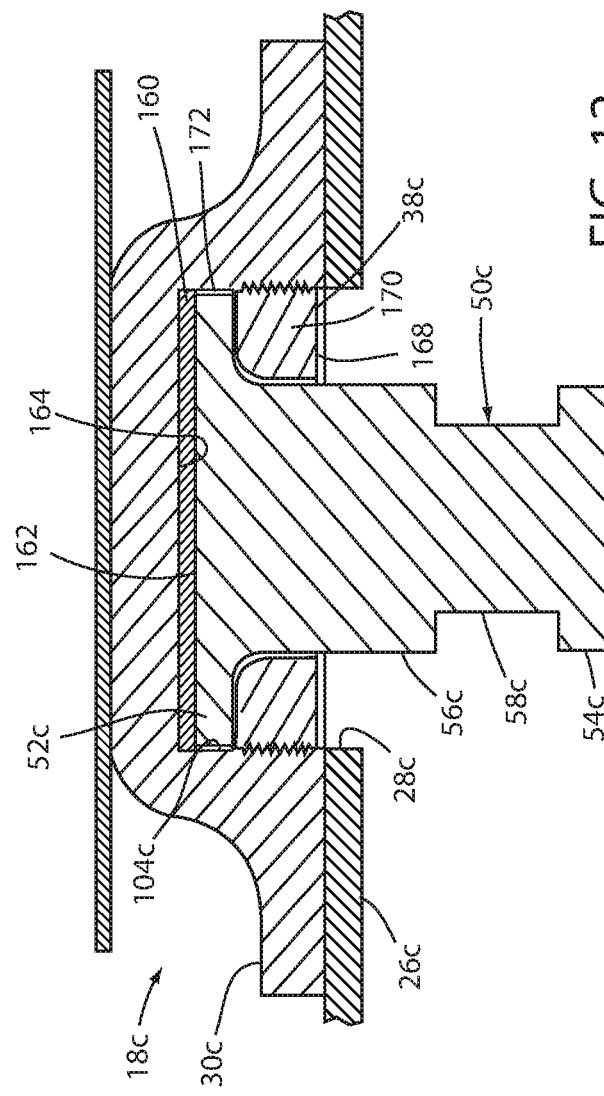
FIG. 12 is a cross-sectional side view of the third alternative embodiment of the kingpin assembly including a sensor arrangement.

The reference numeral 18c (FIGS. 11 and 12) generally designates another embodiment of the kingpin assembly. Since the kingpin assembly 18c is similar to the previously described kingpin assembly 18b, similar parts appearing in FIGS. 4 and 5 and FIGS. 11 and 12 respectively are represented by the same, corresponding reference numeral, except for the suffix "c" in the numerals of the latter. The kingpin assembly 18c includes a lube plate or bearing 160 positioned between an upper surface 162 and a top wall 164 of the bore 104c. In the illustrated example, the collar member 38c comprises an integrated custom load cell 166 that includes an outer deformable housing 168 housing an elastomeric dielectric material 170. The upper head portion 52c of the kingpin 50c is configured such that a gap 172 is located therebetween allowing the kingpin 50c to move relative to the housing 30c, thereby compressing the dielectric material 170 in a manner similar to as discussed above with respect to the sensor arrangement 150.

Figure 14:
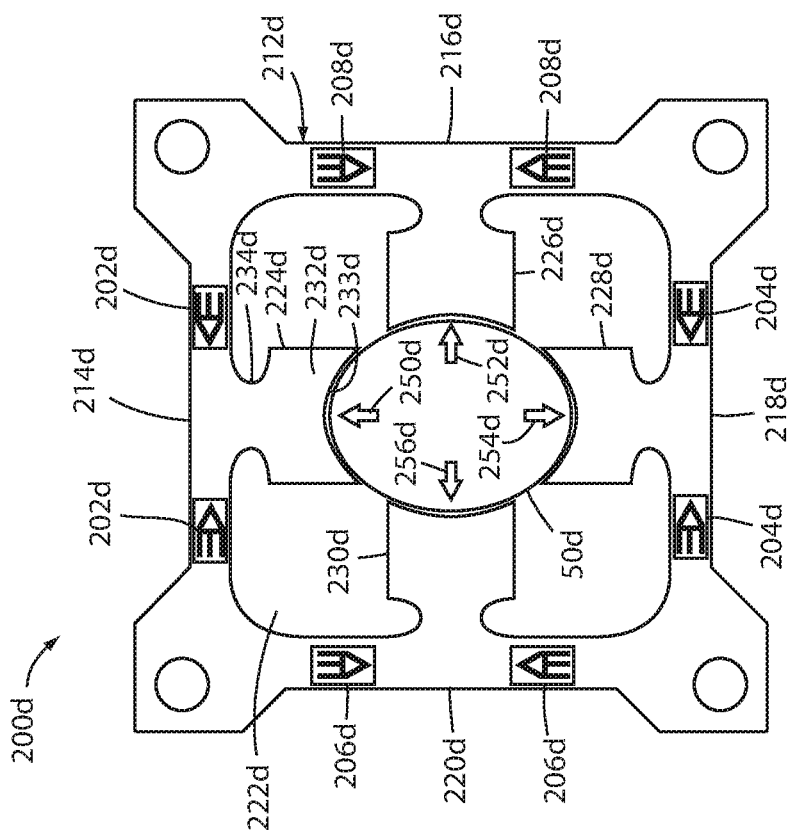
FIG. 14 is a top plan view of yet another alternative embodiment of the sensor arrangement.

In yet another embodiment, the kingpin assembly may include a strain gauge load cell 200 (FIGS. 13 and 14) that includes a first pair of strain gauges including a positive $F_y$ strain gauge 202 and a negative $F_y$ strain gauge 204, and a second pair of strain gauges including a positive $F_x$ strain gauge 206 and a negative $F_x$ strain gauge 208 each coupled to a strain gauge plate 210 positioned within the kingpin assembly. In the illustrated example, the strain gauge plate 210 includes an outer peripheral body including a first wall 214, a second wall 216, a third wall 218 and a fourth wall 220 that cooperate with one another to define an interior space 222. The strain gauge plate 210 further includes a plurality of strain members including a first strain member 224, a second strain member 226, a third strain member 228 and a fourth strain member 230 each extending inwardly from the walls 214, 216, 218, 220, respectively, and each including a widened body portion 232 having an arcuately-shaped, inwardly facing inner face 233, and a relatively narrowed portion 234 positioned between the body portion 232 and the associated wall 214, 216, 218, 220. In operation, the kingpin 50 is positioned between the face 233 of each of the strain members 224, 226, 228, 230 such that movement of the kingpin in any direction relative to the strain gauge plate 210 exerts a corresponding force 250, 252, 254, 256 onto the strain members 224, 226, 228, 230, respectively. The force 250, 252, 254, 256 as exerted on the strain members 224, 226, 228, 230 causes the corresponding wall 214, 216, 218, 220 to deflect in a direction 258, 260, 262, 264, respectively. The deflection of the wall 214, 216, 218, 220 in the direction 258, 260, 262, 264 may be sensed by the strain gauges 202, 208, 204, 206, respectively. The strain as sensed by the sensors 202, 208, 204, 206 may then be utilized to calculate the forces exerted on the kingpin 50.

Figure 13:
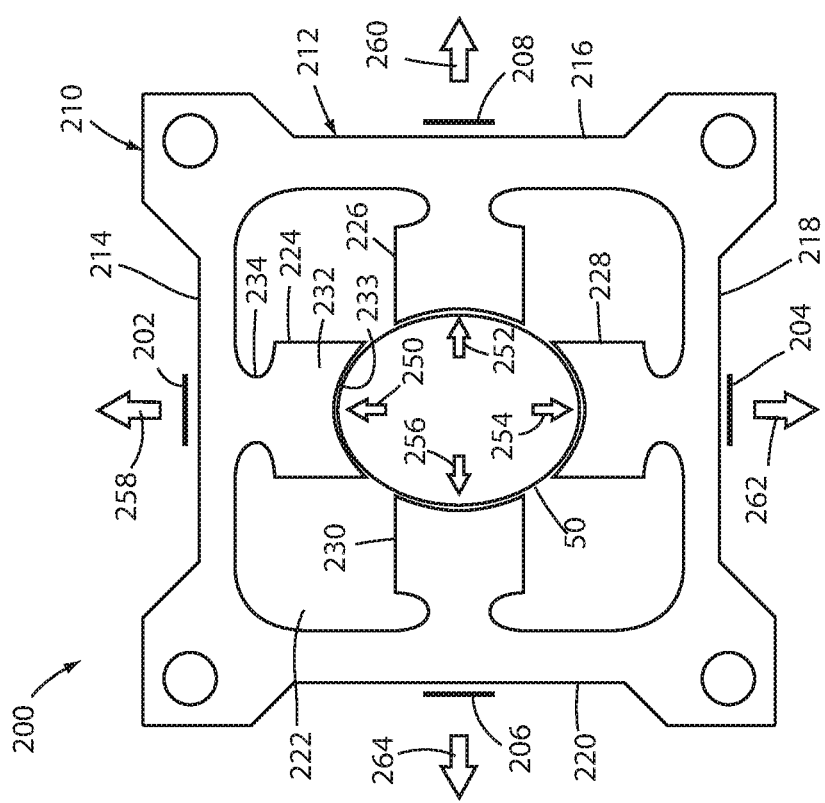
FIG. 13 is a top plan view of another alternative embodiment of the sensor arrangement.

The reference 200d (FIG. 14) generally designates another embodiment of the load cell arrangement illustrated in FIG. 13. Since the load cell arrangement 200d is similar to the load cell arrangement 200, similar parts appearing in FIG. 13 and FIG. 14 respectively are represented by the same, corresponding reference numeral, except for the suffix "d" in the numerals of the latter. The load cell arrangement 200d is similar in construction and assembly of the load cell arrangement 200 with the most notable exception being the replacement of the strain gauges 202, 204, 206, 208, with strain gauges 202d, 204d, 206d and 208d positioned within walls 214d, 218d, 220d and 216d, respectively so as to sense shear strain within the walls.

Figure 15:
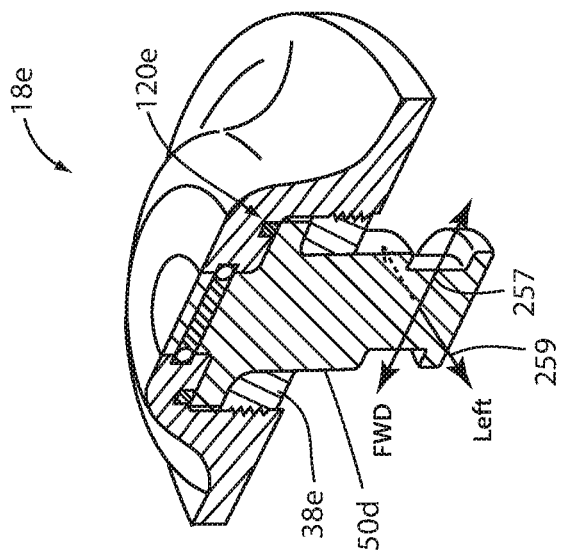
FIG. 15 is a cross-sectional side view of a fourth alternative embodiment of the kingpin assembly.
Figure 16:
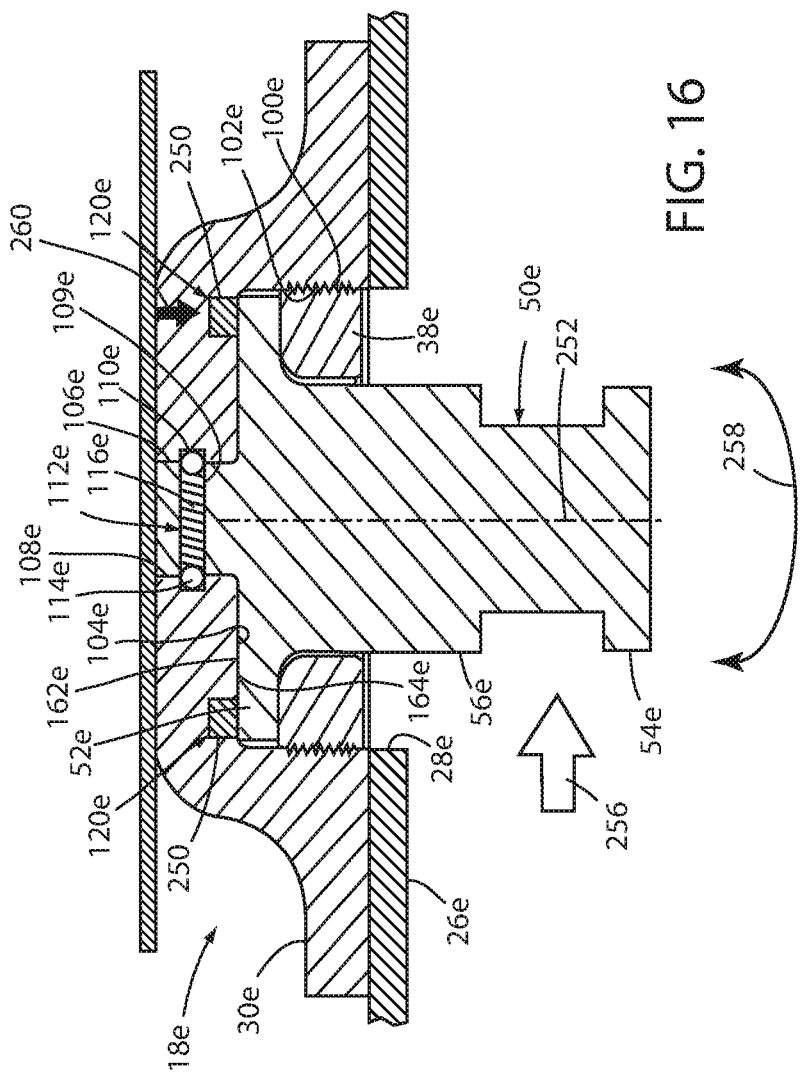
FIG. 16 is a cross-sectional side view of the fourth alternative embodiment of the kingpin assembly including a sensor arrangement.

The reference 18e (FIGS. 15 and 16) generally designates another embodiment of the kingpin assembly. Since the kingpin assembly 18e is similar to the previously described kingpin assembly 18a, similar parts appearing in FIGS. 4 and 5 and in FIGS. 15 and 16 respectively are represented by the same, corresponding reference numeral, except for the suffix "e" in the numerals of the latter. In the illustrated example, the kingpin assembly 18e includes a sensor arrangement 120e that includes a plurality of contact force sensors, including a first pair of sensors 250 and a second pair of contact sensors (not shown) positioned substantially orthogonally offset from the first pair of contact sensors 250 about a central axis 252 of the kingpin 50e. In the illustrated example, each of the contact sensors are positioned between the top surface 162e of the kingpin 50e and the top wall 164e of the bore 104e. In operation, a force 256 exerted on the kingpin 50e in a forward-rearward or longitudinal direction 257 and/or a left-right or lateral direction 259 results in a moment 258 and a force 260 being exerted on the contact sensors 250. These forces as measured by the contact sensors 250 may then be used to calculate the force is exerted on the kingpin 50e.

Figure 17:
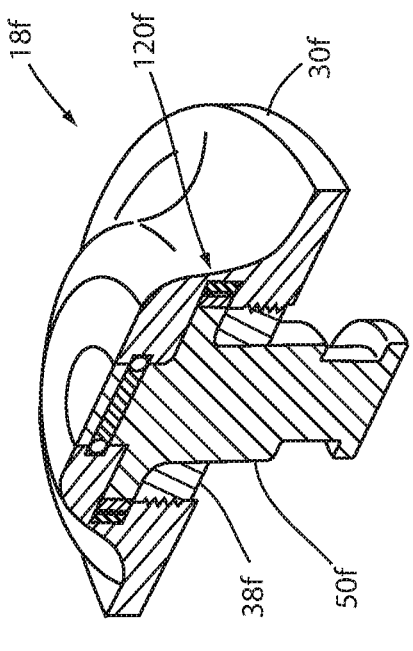
FIG. 17 is a cross-sectional perspective view of a fifth alternative embodiment of the kingpin assembly.
Figure 19:
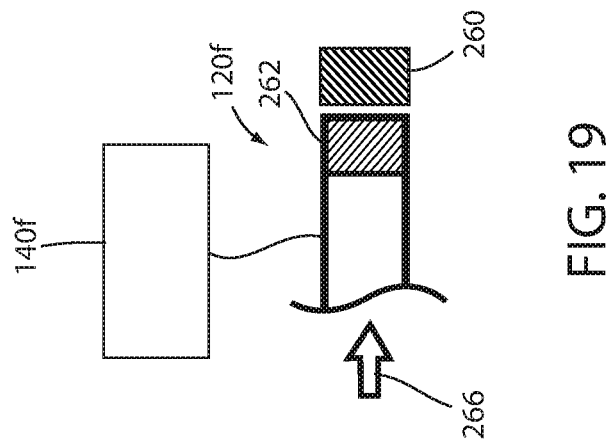
FIG. 19 is a schematic view of the sensor arrangement of FIG. 19.
Figure 18:
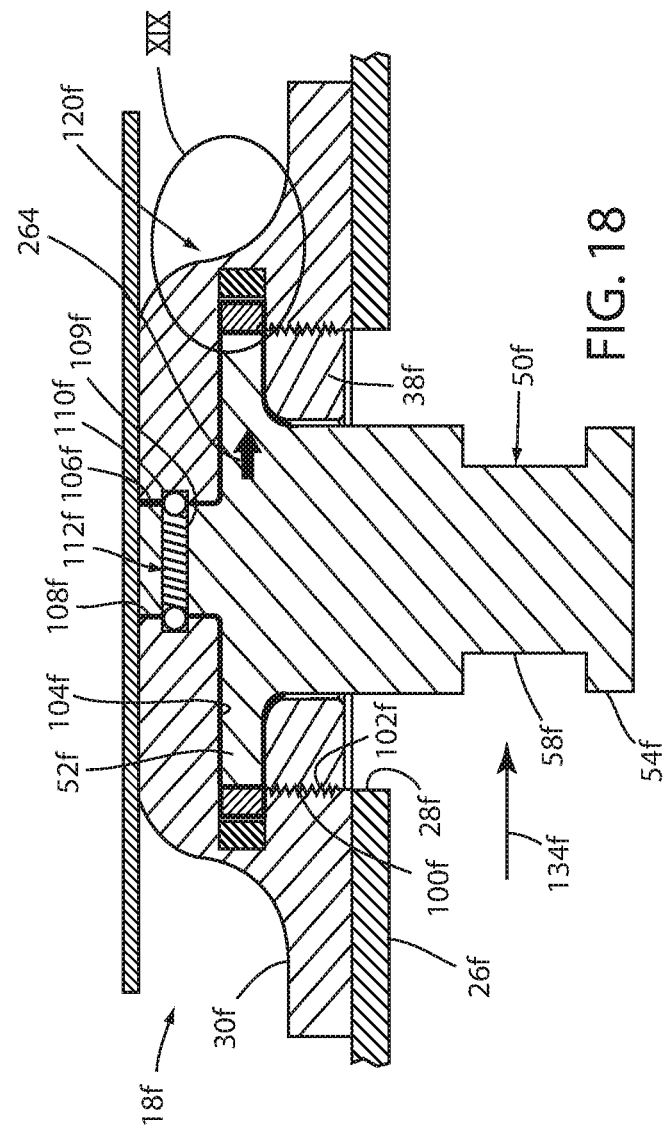
FIG. 18 is a cross-sectional side view of the fifth alternative embodiment of the kingpin assembly including a sensor arrangement.

The reference numeral 18f (FIGS. 17 and 18) generally designates another embodiment of the kingpin assembly. Since the kingpin assembly 18f is similar to the previously described kingpin assembly 18e, similar parts appearing in FIGS. 4 and 5 and FIGS. 18 and 19 respectively are represented by the same, corresponding reference numeral, except for the suffix "f" in the numerals of the latter. In the illustrated example, the kingpin assembly 18f is similar in construction and assembly to the kingpin assembly 18a with the most notable exception being the sensor arrangement 120f. In the illustrated example, the sensor arrangement 120f (FIG. 19) includes a pressure sensor positioned between the upper head portion 52f of the kingpin 50f and of the housing 30f, and an elastomeric spring 262 positioned between the pressure sensor 260 and the upper head portion 52f of the kingpin 50f and of the housing 30f. In operation, a force 134f exerted on the kingpin 50f results in a movement of the kingpin 50f in a direction 264, thereby resulting in a force 266 being applied to the pressure sensor 260. Information collected from the pressure sensor 260 may then be communicated with the controller 140f and used to calculate the forces exerted on the kingpin 50f.

Figure 20:
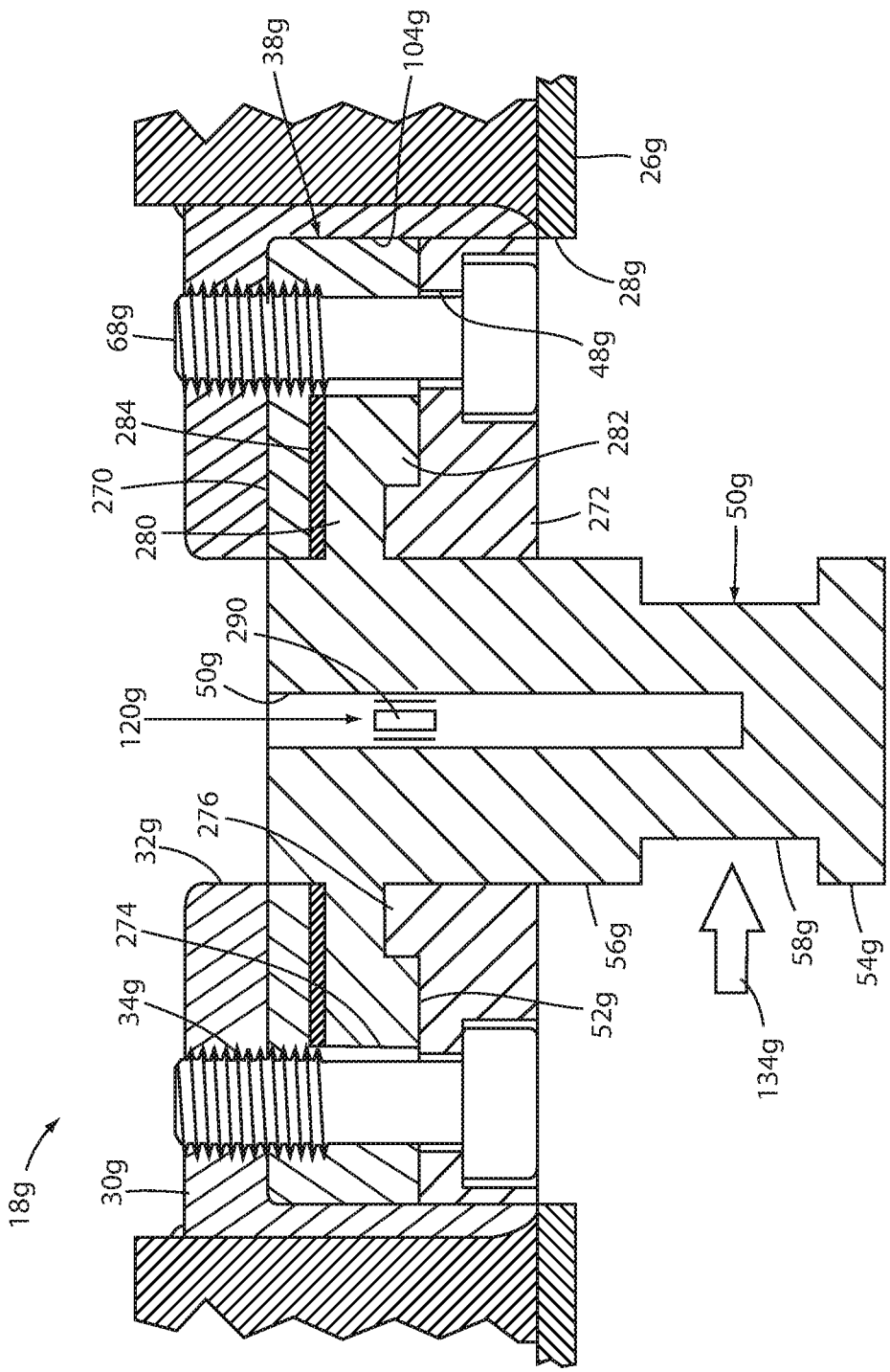
FIG. 20 is a cross-sectional side view of a sixth alternative embodiment of the kingpin assembly.
Figure 21:
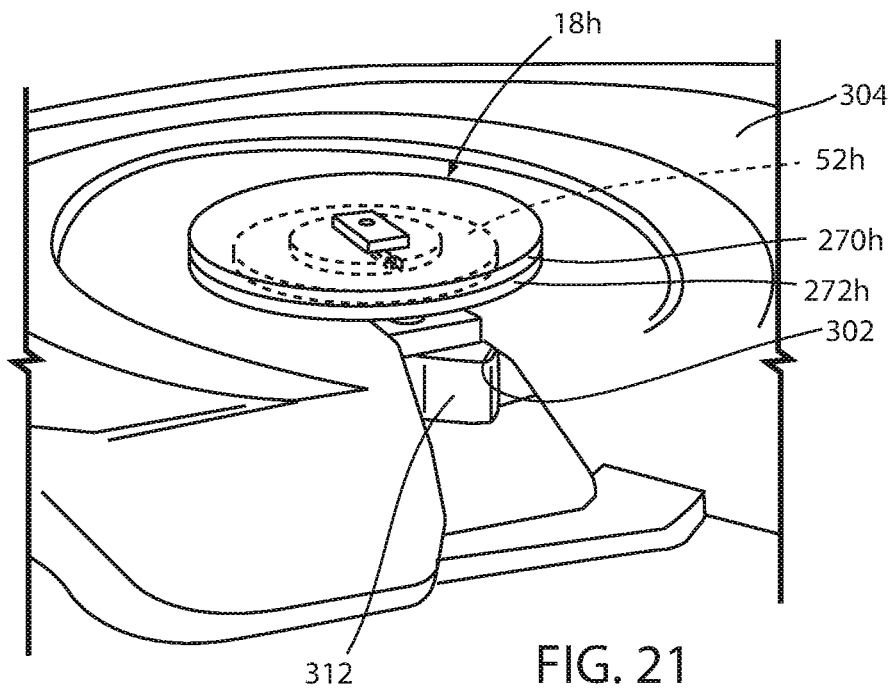
FIG. 21 is a partial schematic view of another embodiment of the kingpin assembly coupled with a fifth wheel hitch plate.

The reference numeral 18g (FIG. 20) generally designates another embodiment of the kingpin assembly. Since the kingpin assembly 18g is similar to previously-described kingpin assembly 18, similar parts appearing in FIG. 3 and FIG. 21 respectively are represented by the same, corresponding reference numeral, except for the suffix "g" in the numerals of the latter. In the illustrated example, the kingpin assembly 18g includes a collar 38g and a kingpin 50g. The collar 38g includes an upper support ring 270 and a lower support ring 272. The upper support ring 270 includes a stepped bore 274 within which the upper head portion 52g of the kingpin 50g is received. The lower support ring 272 includes a cylindrically-shaped alignment portion 276 that cooperates to rotatably guide the kingpin 50g therewith, as described below. The upper support ring 270 and the lower support ring 272 each include a plurality of bolt-receiving apertures 48g spaced circumferentially thereabout. The kingpin 50g includes the upper head portion 52g, the lower head portion 54g, the body portion 56g, and the lock assembly receiving portion 58g. The upper head portion 52g includes a radially outwardly-extending portion 280 having a downwardly-extending, cylindrically-shaped alignment portion 282 spaced from the body portion 56g. A central bore 283 extends along a length of the kingpin 50g.

In assembly, the upper head portion 52g is received within the bore 274 of the upper support ring 270, while the alignment portion 276 of the lower support ring 272 and the alignment portion 282 of the kingpin 50g are coupled with one another such that the alignment portion 276 is aligned radially inward from the alignment portion 282 and rotatably guides the same. A wear disk 284 is located with the bore 274 and between the upper head portion 52g of the kingpin 50g and the upper support ring 270. The kingpin 50g, the upper support ring 270 and the lower support ring 272 are positioned within the recess 104g of the housing 30g and secured therein by a plurality of bolts 68g extending through the apertures 48g of the upper support ring 270 and the lower support ring 272, and threadably received within the apertures 34g of the housing 30g.

The kingpin assembly 18g further includes a sensor arrangement 120g. In the illustrated example, the sensor arrangement 120g includes a plurality of strain gauges 290 positioned within the central bore 283 such that the strain gauges 290 may be utilized to detect deflection of the kingpin 50g when a force 134g is exerted on the kingpin 50g, thereby allowing calculation of the forces being exerted on the kingpin 50g.

Figure 22:
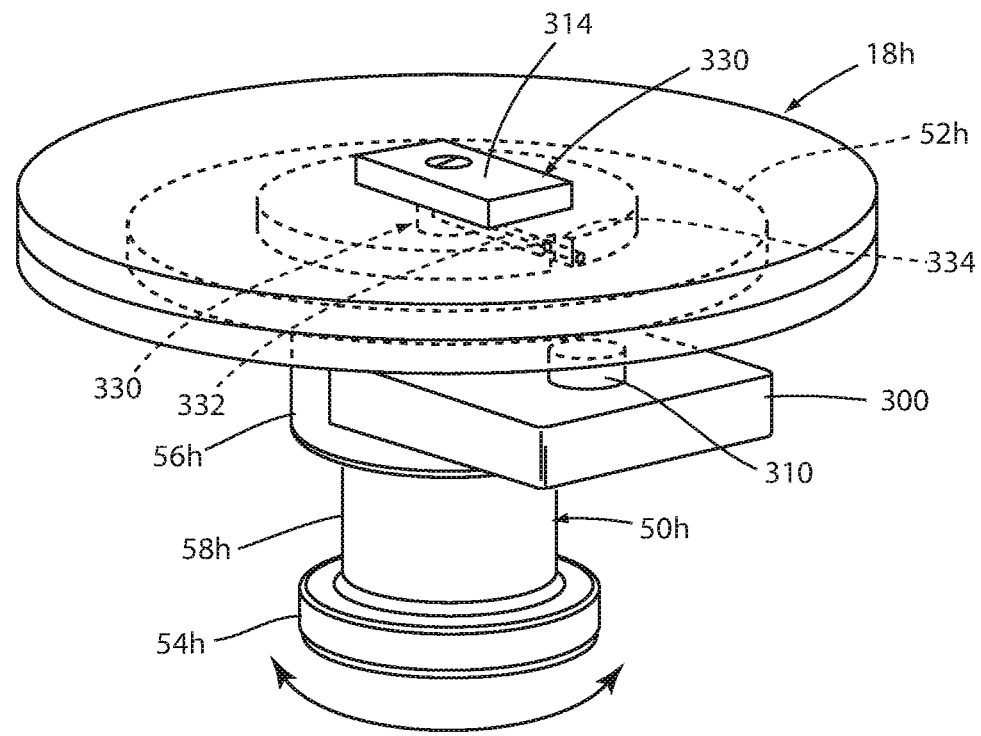
FIG. 22 is a perspective view of the kingpin assembly of FIG. 21.

The reference 18h (FIGS. 21 and 22) generally designates another embodiment of the present kingpin assembly. Since the kingpin assembly 18h is similar to the kingpin assembly 18g, similar parts appearing in FIG. 20 and FIGS. 21 and 22 respectively are represented by the same, corresponding reference numeral, except for the suffix "h" in the numerals of the latter. In the illustrated example, the upper head portion 52h of the kingpin 50h is rotatably contained between the upper support ring 270h and the lower support ring 272h. Various embodiments of the kingpin assembly as previously described herein include varied sensor arrangements, wherein some of the sensor arrangements may need to be calibrated or aligned to a zero position where the kingpin is prevented from rotating with respect to the fifth wheel hitch plate so that the sensors may adequately sense and monitor the true rotation of the kingpin relative to the associated housing, thereby allowing calculation of the forces exerted on the kingpin. In the illustrated example, the kingpin 50h further includes an alignment or flag portion 300 that is configured to be received within and abut the sides of a throat 302 of a fifth wheel hitch plate 304. Although the alignment element 300 as illustrated is provided with a rectangularly-shaped configuration as illustrated, other geometrical configurations may also be utilized.

In one embodiment, the kingpin assembly may also incorporate a lock sensor 310 configured so as to be able to detect the presence or position of an associated locking arrangement such as a pair of lock jaws 312 and whether the lock jaws 312 are in the correct position so as to secure the kingpin 50h within the throat 302 of the fifth wheel hitch plate 304. The lock sensor 310 may include a Hall effect type sensor, inductive proximity sensors or other sensors adequate for sensing the relative position(s) of components of the locking arrangement.

The kingpin assembly 18h may also include a sensor for detecting the rotation of the kingpin 50h with respect to the associated housing. Wherein the rotation sensor 314 may include an absolute rotary encoder, a potentiometer, a Hall effect sensor or other sensor configured to provide such information.

The signals from the sensors 310, 314 may be communicated to a low-power electronic control unit which is configured to transmit information collected from the sensors to other electronic systems within or remote from the vehicle via a wired communication bus, such as a controller area network (CAN), a local interconnect network (LIN), a medium oriented systems transport (MOST), and the like, or via a wireless signal, such as Bluetooth®, Zigbee, Wi-Fi, and the like. In the illustrated configuration, it may be required that the kingpin 50h be positioned at a "zero" position where the alignment element 300 extends rearwardly so as to enable proper alignment and coupling of the kingpin 50h with the fifth wheel hitch plate 304. A return or alignment arrangement 330 is configured to return the kingpin 50h to the "zero" position. In the illustrated example, the return arrangement 300 includes a rotational deflection spring 332 deflected by a keyway 334 in both directions of rotation of the kingpin 50h. When deflected, the spring 332 exerts a restoring force on the keyway 334 that returns the kingpin 50h to the "zero" position.

The present inventive kingpin assembly allows free rotation of the kingpin by reducing operational wear of the same, allows easy access to and replacement of an associated kingpin subsequent to wear thereof, reduces the amount of maintenance typically required for fifth wheel hitch assemblies, and reduces wear due to debris entering the overall assembly. Further, the present inventive assembly is more durable, allows replacement of certain components thereof by even unskilled personnel, is extremely efficient in use, capable of a long operating life, and particularly well adapted for the proposed use.

The above description is considered that of the preferred embodiments only. Modifications of the embodiments disclosed herein will occur to those skilled in the art and to those who make or use the disclosed embodiments. Therefore, it is understood that the embodiments shown in the drawings and described above are merely for illustrative purposes and not intended to limit the scope of the invention, which is defined by the following claims as interpreted according to the principles of patent law, including the doctrine of equivalents.

It will be understood that any described processes or steps within described processes may be combined with other disclosed processes or steps to form structures within the scope of the present disclosure.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A kingpin assembly, comprising:
a housing having a recess located therein;
a kingpin having at least a portion located within the recess of the housing, wherein the kingpin is secured within the recess of the housing, and wherein the kingpin includes an axis extending along a length of the kingpin; and
a sensor arrangement located entirely between the housing and an exterior surface of the kingpin and configured to sense a force exerted on the kingpin in a first direction that is substantially perpendicular to the longitudinal axis and in a second direction that is substantially perpendicular to the first direction.

2. The kingpin assembly of claim 1, wherein the first direction extends in a substantially longitudinal direction.

3. The kingpin assembly of claim 1, wherein the first direction extends in a substantially lateral direction with respect to the kingpin.

4. The kingpin assembly of claim 1, wherein the sensor arrangement includes a load cell.

5. The kingpin assembly of claim 1, wherein the load cell includes a Hall affect sensor.

6. The kingpin assembly of claim 1, wherein the sensor arrangement includes a first pair of strain gauges positioned on opposite sides of the kingpin.

7. The kingpin assembly of claim 1, wherein the sensor arrangement includes an elastomeric spring positioned between the kingpin and the housing, and a pressure sensor positioned between the elastomeric spring and the housing.

8. The kingpin assembly of claim 1, wherein the kingpin is rotatably secured within the housing.

9. A kingpin assembly, comprising:
a housing having a recess located therein;
a kingpin having at least a portion located within the recess of the housing, wherein the kingpin is rotationally secured within the recess of the housing, and wherein the kingpin includes an axis extending along a length of the kingpin; and
a sensor arrangement located entirely between the housing and an exterior surface of the kingpin and configured to sense a first force exerted on the kingpin in a first direction that is substantially perpendicular to the longitudinal axis and a second force exerted on the kingpin in a second direction that extends in a substantially lateral direction, wherein the first direction extends in a substantially longitudinal direction.

10. The kingpin assembly of claim 9, wherein the sensor arrangement includes a load cell.

11. The kingpin assembly of claim 10, wherein the load cell includes a capacitive load cell.

12. The kingpin assembly of claim 9, wherein the sensor arrangement includes a first pair of strain gauges positioned on opposite sides of the kingpin and a second pair of strain gauges positioned on opposite sides of the kingpin and substantially orthogonally offset from the first pair of strain gauges.

13. A kingpin assembly, comprising:
a housing having a recess located therein; and
a kingpin having at least a portion located within the recess of the housing, wherein the kingpin is rotatably secured within the recess of the housing for pivoting movement about a longitudinal axis of the kingpin;
a sensor arrangement located entirely between the housing and an exterior surface of the kingpin and configured to sense a force exerted on the kingpin in a first direction that is substantially perpendicular to the longitudinal of the kingpin; and
a biasing member configured to rotatably bias the kingpin to a selected position with respect to the housing.

14. The kingpin assembly of claim 13, wherein the biasing member biases that kingpin to a preselected point of rotating the kingpin within the housing.

15. The kingpin assembly of claim 13, further comprising:
a rotation sensor configured to measure the rotation of the kingpin with respect to the fifth wheel hitch plate when the kingpin is engaged with the fifth wheel hitch plate.

16. The kingpin assembly of claim 15, wherein the rotation sensor includes an absolute rotary encoder.

17. The kingpin assembly of claim 13, wherein the biasing arrangement includes a torsion spring.

18. The kingpin assembly of claim 13, wherein the kingpin includes an engagement member configured to prevent rotation of the kingpin with respect to a fifth wheel hitch plate when the kingpin is engaged with the fifth wheel hitch plate.

19. The kingpin assembly of claim 18, wherein the engagement member is configured to engage a throat of a fifth wheel hitch plate when the kingpin is engaged with the fifth wheel hitch plate.

20. The kingpin assembly of claim 13, wherein the sensor includes a load cell.

\* \* \* \* \*